United States Patent
Bloemenkamp (10) Patent No.: US 9,651,704 B2
(45) Date of Patent: May 16, 2017

(54) SYSTEMS AND METHODS FOR RESISTIVITY MEASUREMENT AT MULTIPLE ANGLES OF ROTATION

(71) Applicant: Schlumberger Technology Corporation, Sugar Land, TX (US)

(72) Inventor: Richard Bloemenkamp, Issy-les-Moulineaux (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 335 days.

(21) Appl. No.: 14/108,291

(22) Filed: Dec. 16, 2013

(65) Prior Publication Data

US 2014/0184229 A1  Jul. 3, 2014

(30) Foreign Application Priority Data

Dec. 28, 2012  (EP) .................................... 12306707

(51) Int. Cl.
*G01V 3/20* (2006.01)
*G01V 3/24* (2006.01)

(52) U.S. Cl.
CPC . *G01V 3/20* (2013.01); *G01V 3/24* (2013.01)

(58) Field of Classification Search
USPC ....... 324/369, 370, 356, 355, 339, 324, 303, 324/338, 366, 333, 346, 347, 351; 702/7, 702/6, 9; 175/50, 45, 57; 73/152.02, 73/152.03, 152.19, 61.55; 166/250.01, 166/254.2
See application file for complete search history.

(56) References Cited

U.S. PATENT DOCUMENTS

| | | | |
|---|---|---|---|
| 6,801,039 B2 | 10/2004 | Fabris et al. | |
| 7,095,233 B1 * | 8/2006 | Tabanou et al. | ............. 324/369 |
| 7,385,401 B2 | 6/2008 | Itskovich et al. | |
| 7,394,257 B2 * | 7/2008 | Martinez et al. | ............. 324/356 |
| 7,394,258 B2 | 7/2008 | Itskovich et al. | |
| 7,616,001 B2 | 11/2009 | Itskovich | |

(Continued)

FOREIGN PATENT DOCUMENTS

| | | |
|---|---|---|
| EP | 0556114 | 8/1993 |
| EP | 2182392 | 5/2010 |
| WO | 2010/049105 | 5/2010 |

OTHER PUBLICATIONS

Extended search report for the equivalent European patent application No. 12306707.6 issued on Jun. 5, 2013.

*Primary Examiner* — Melissa Koval
*Assistant Examiner* — Nasima Monsur (57) ABSTRACT

Systems and methods are provided to obtain multiple resistivity measurements using a resistivity tool eccentered and rotating in a wellbore, which may be used to ascertain information relating to a drilling fluid in the wellbore. One such system includes a resistivity tool and data processing circuitry. The resistivity tool may become eccentered in a wellbore filled with drilling mud at least when the wellbore is at least partially deviated. The resistivity tool may also rotate within the wellbore and to obtain at least two resistivity measurements at different corresponding angles of rotation within the wellbore. The data processing circuitry may determine a mud phase angle by comparing the resistivity measurements obtained by the resistivity tool.

14 Claims, 10 Drawing Sheets

(56) References Cited

U.S. PATENT DOCUMENTS

| | | | |
|---|---|---|---|
| 2006/0173624 A1* | 8/2006 | Frenkel | G01V 3/265 |
| | | | 702/7 |
| 2006/0238202 A1* | 10/2006 | Gorek | G01V 3/20 |
| | | | 324/373 |
| 2008/0288171 A1 | 11/2008 | Itskovich et al. | |
| 2008/0297161 A1* | 12/2008 | Gorek | G01V 3/28 |
| | | | 324/342 |
| 2009/0292471 A1 | 11/2009 | Bespalov et al. | |
| 2010/0007348 A1* | 1/2010 | Fang et al. | 324/339 |
| 2010/0039115 A1 | 2/2010 | Bespalov et al. | |
| 2010/0082255 A1* | 4/2010 | Davydycheva et al. | 702/7 |
| 2011/0199090 A1* | 8/2011 | Hayman | 324/356 |

* cited by examiner

SYSTEMS AND METHODS FOR RESISTIVITY MEASUREMENT AT MULTIPLE ANGLES OF ROTATION

BACKGROUND

This disclosure relates to measuring resistivity in a well at two or more angles of rotation in an eccentered resistivity tool, which may be used to account for properties of drilling fluid.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions.

Many downhole tools have been developed to determine properties of geological formations surrounding wells. One such downhole tool is referred to as a resistivity tool. Resistivity tools may inject a current into the surrounding geological formation using an injection electrode. The current may return to the tool from the geological formation via a return electrode. In general, the injection electrode may represent a current-measuring electrode through which this current may be measured. By measuring the current, resistivity tools may determine the impedance, or resistivity, of the surrounding formation. Since different types of geological formations may have different resistivities (impedances), determining the resistivity of the surrounding formation may provide an indication of the properties of the geological formation surrounding the well.

A resistivity tool may be used while the well is being drilled as a logging-while-drilling (LWD) tool, or afterward as a tool conveyed by wireline, coiled tubing, slickline, or other conveyance. When used as an LWD tool, the resistivity tool is a component of a drill string. While a well is being drilled, a long string of drill pipe, generally referred to as the drill string, may be used to drill into the geological formation. In the drilling process, drilling fluid, also referred to as "mud," is pumped down into the drill string to mechanically power the rotation of the drill bit and to help remove rock cutting out of the wellbore. Thus, in a logging-while-drilling (LWD) setting, the wellbore may be full of drilling fluid while a resistivity measurement is being obtained. The presence of the drilling fluid may disrupt the resistivity measurement of the geological formation that surrounds the wellbore. This is especially true when the drilling fluid is an oil-based mud. Previous efforts to account for drilling fluid in resistivity measurements have involved the use of multiple injection electrodes or multiple return electrodes at varying locations within the resistivity tool, which may increase the cost and complexity of the resistivity tool.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure relate to systems and methods to obtain multiple resistivity measurements using a resistivity tool eccentered and rotating in a wellbore. These multiple resistivity measurements may be used to ascertain information relating to a drilling fluid in the wellbore. One such system includes a resistivity tool and data processing circuitry. The resistivity tool may become eccentered in a wellbore filled with drilling mud at least when the wellbore is at least partially deviated. The resistivity tool may also rotate within the wellbore and to obtain at least two resistivity measurements at different corresponding angles of rotation within the wellbore. The data processing circuitry may determine a mud phase angle by comparing the resistivity measurements obtained by the resistivity tool.

In a second example, one or more non-transitory computer-readable media may include instructions to receive and process resistivity measurements to determine a mud phase angle associated with a drilling fluid in a deviated wellbore. The instructions may include instructions to receive a first resistivity measurement and a second resistivity measurement. The first resistivity measurement may have been obtained via an electrode of a logging-while-drilling resistivity tool eccentered in the deviated wellbore filled when the electrode is at a first angle of rotation within the deviated wellbore. The second resistivity measurement may have been obtained while the electrode is at a second angle of rotation. Having received the first and second resistivity measurements, the instructions may include instructions to subtract the larger of these from the smaller to obtain a complex impedance difference vector. The instructions further may include instructions to determine the mud phase angle associated with the drilling fluid by determining a phase angle of the complex impedance difference vector.

In a third example, a method includes disposing a resistivity tool into a wellbore filled with a drilling fluid and surrounded by a geological formation, obtaining first and second resistivity measurements, and processing the first and second resistivity measurements to ascertain a complex impedance vector due substantially entirely to the drilling fluid rather than the geological formation. The first resistivity measurement may be obtained using an electrode of the resistivity tool when the electrode is disposed a first standoff from the geological formation within the wellbore. The second resistivity measurement may be obtained using the same electrode when the electrode is disposed a second standoff from the geological formation within the wellbore.

Various refinements of the features noted above may exist in relation to various aspects of this disclosure. Further features may also be incorporated in these various aspects as well. These refinements and additional features may exist individually or in any combination. For instance, various features discussed below in relation to one or more of the illustrated embodiments may be incorporated into any of the above-described aspects of this disclosure alone or in any combination. The brief summary presented above is intended to familiarize the reader with certain aspects and contexts of embodiments of this disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are examples of the presently disclosed techniques. Additionally, in an effort to provide a concise description of these embodiments, certain features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

This disclosure relates to logging-while-drilling (LWD) resistivity tools that can isolate some characteristics of drilling fluid from resistivity measurements when used in a deviated wellbore (a wellbore that is at least partially horizontal). As mentioned above, resistivity tools may inject a current into the surrounding geological formation using an injection electrode and measure the current that returns to the tool from the geological formation using a return electrode. By measuring the current that returns to the resistivity tool from the formation, resistivity tools may determine the impedance, or resistivity, of the surrounding formation. Since different types of geological formations may have different resistivities (impedances), determining the resistivity of the surrounding formation may provide an indication of the properties of the geological formation surrounding the well. An LWD resistivity tool is a resistivity tool that is installed in a drill string used to drill a wellbore into a geological formation.

The LWD resistivity tool of this disclosure may obtain resistivity measurements of the geological formation surrounding a wellbore that may account for the presence of drilling fluid in the wellbore. As used herein, the term "resistivity measurement" refers to any resistance measurement, which may include a complex impedance having both real (resistive) and imaginary (reactive) components. The LWD resistivity may do so without using multiple injection or return electrodes—which may add cost or complexity to the tool—but rather may obtain multiple resistivity measurements as the LWD resistivity tool rotates within a deviated wellbore using only one current-measuring electrode. Indeed, using only one current-measuring electrode may not only reduce the cost of an additional electrode, but also the complexity of calibrating two separate electrodes to one another. Within a deviated wellbore, the LWD resistivity tool may be eccentered in the wellbore. As the angle of rotation of the LWD resistivity tool changes, the eccentered LWD resistivity tool may obtain resistivity measurements at different standoffs, or distances between the electrodes of the LWD resistivity tool and the wall of the geological formation. The resistivity measurements obtained at various standoffs while the eccentered LWD resistivity tool rotates can then be used to isolate certain properties due only to the drilling fluid rather than the geological formation. Ascertaining properties of the drilling fluid may enable a better understanding of components of the resistivity measurement due to the geological formation rather than the drilling fluid.

Figure 1:
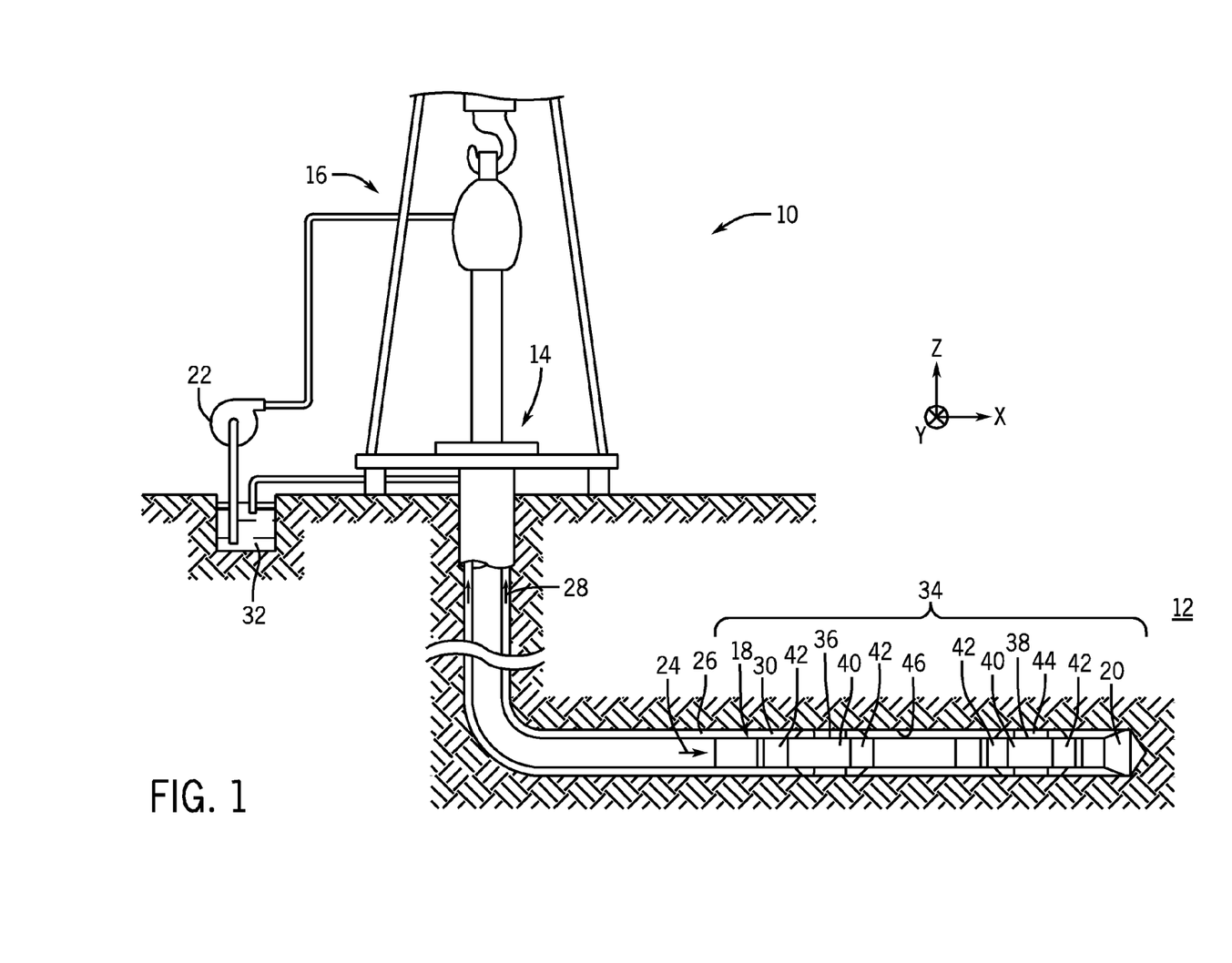
FIG. 1 is a partial cross-sectional view of a drilling system with a logging-while-drilling (LWD) resistivity tool to obtain resistivity measurements at multiple angles of rotation with multiple corresponding standoffs, in accordance with an embodiment.

With this in mind, FIG. 1 illustrates a drilling system 10 to drill into a geological formation 12 to produce a wellbore 14. At the surface 16, a drill string 18 that includes a drill bit 20 at its lower end is rotated into the geological formation 12. While the drill string 18 is illustrated in FIG. 1, the embodiments of this disclosure may be used in any suitable rotating downhole device, including work strings and pipe strings. As the drill bit 20 rotates, a "mud" pump 22 forces drilling fluid 24, which may be referred to as "mud" or "drilling mud," through the drill string 18 to the drill bit 20. The drilling fluid 24, which is used to cool and lubricate the drill bit 20, exits the drill string 18 through the drill bit 20. The drilling fluid 24 may carry drill cuttings 26 out of the wellbore 14 as the drilling fluid 24 flows back to the surface 16. The flow of the drilling fluid 24 out of the wellbore 14 is shown by arrows 28, illustrating that the drilling fluid 24 exits the wellbore 14 through an annulus 30 between the drill string 18 and the geological formation 12. At the surface 16, the drilling fluid 24 is filtered and conveyed back to a mud pit 32 for reuse.

The environment of the wellbore 14 may vary widely depending upon the location and situation of the geological formation 12. For example, rather than a land-based operation, the wellbore 14 may be drilled into the geological formation 12 under water of various depths, in which case the surface 16 may include topside equipment such as an anchored or floating platform, and some of the components used may be positioned at or near a point where the wellbore 14 enters the earth beneath a body of water. Moreover, in the example of FIG. 1, the wellbore 14 is "deviated," or at least partially horizontal. In other examples, areas of the wellbore 14 that are drilled at any angle other than completely vertical may employ the techniques of this disclosure. A coordinate system having x, y, and z axes is shown in FIG. 1. This coordinate system will also be used further below with respect to other drawings.

As illustrated in FIG. 1, the lower end of the drill string 18 includes a bottom-hole assembly ("BHA") 34 that includes the drill bit 20, as well as several drill collars 36, 38 that may include logging-while-drilling ("LWD") tools 40 and/or measurement-while drilling ("MWD") tools 42. The LWD tools 40 of FIG. 1 are each housed in a particular area of the drill collar 36, 38, and each may contain any suitable number of logging tools and/or fluid sampling devices. The LWD tools 40 may include capabilities to measure, process, and/or store collected information, as well as to communicate with the MWD tools 42 and/or directly with the surface 16 (e.g., a logging and control computer). The BHA 34 may include more or fewer LWD tools 40 than those shown in FIG. 1. In any case, at least one of the LWD tools 40 may be an LWD resistivity tool 40.

Figure 2:
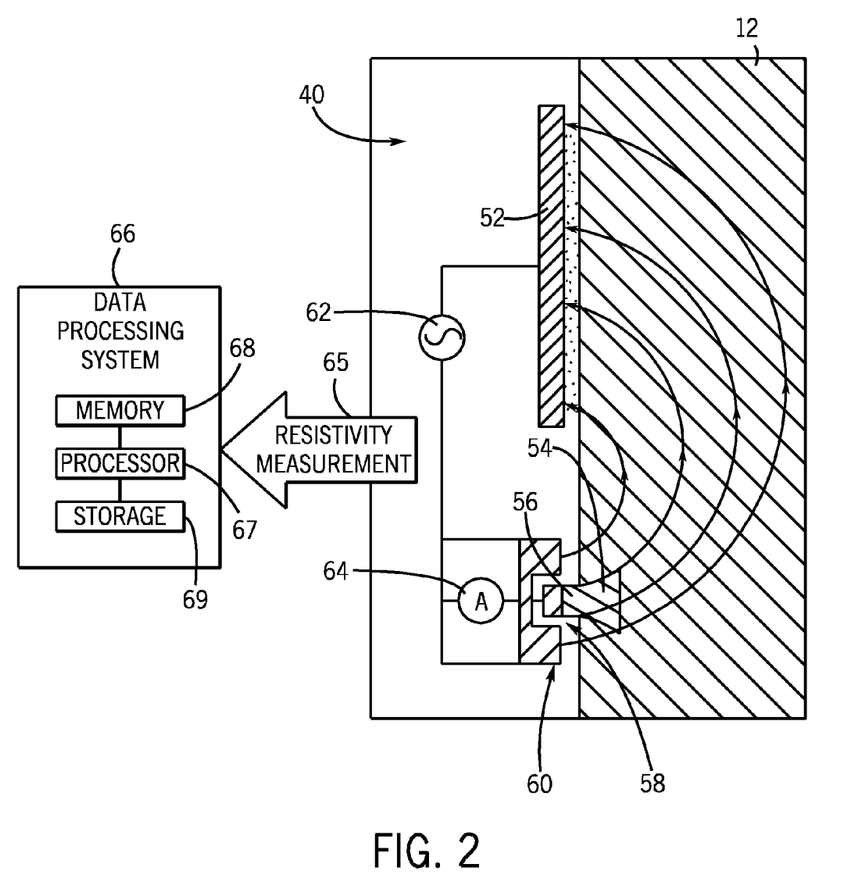
FIG. 2 is a schematic diagram of the resistivity tool, in accordance with an embodiment.

One example of the LWD resistivity tool 40 is shown in FIG. 2. Specifically, FIG. 2 represents a partial cross-section block diagram of the LWD resistivity tool 40 and the effect of a current injection principle by which the LWD resistivity tool 40 may operate. The LWD resistivity tool 40 shown in FIG. 2 includes a return electrode 52 that receives a current that passes through an imaging region 54 of the geological formation 12 after the current has been injected by an injection electrode 56 (also referred to as a "button"). The injection electrode 56 may be electrically isolated (numeral 58) by a guard electrode 60 that surrounds the injection electrode 56. The guard electrode 60 may be electrically isolated from both the injection electrode 56 and the return electrode 52. The electrical potential between the guard electrode 60 and the injection electrode 56 may be very small (or zero) compared to the electrical potential between the injection electrode 56 and the return electrode 52.

Although the return electrode 52 is illustrated as a separate component of the LWD resistivity tool 40, a collar of the drill string 18 may function as the return electrode 52 in some embodiments. Moreover, the injection electrode 56, which may represent a current-measuring electrode as discussed above, may be smaller than 2 inches in diameter. It is believed that a current-measuring electrode greater than 2 inches in diameter may not be able to deliver a borehole image with acceptable resolution. Finally, the injection electrode 56 may represent the only current-measuring electrode of the LWD resistivity tool 40. Using only one current-measuring electrode may not only reduce the cost of an additional electrode, but also the complexity of calibrating two separate electrodes to one another were another injection electrode 56 present in the LWD resistivity tool 40.

A voltage source 62 may generate a potential difference between the injection electrode 56 and the return electrode 52. Since the injection electrode 56 and the return electrode 52 have different voltage potentials, current will be injected into the geological formation 12 generally along paths such as those shown in FIG. 2. An ammeter 64 measures the current that is injected into the geological formation 12. In some embodiments, the ammeter 64 may take the form of a small known resistor, and the current that is injected into the geological formation 12 can be determined by measuring the voltage across this small known resistor of the ammeter 64. The voltage source 62 may generate the potential difference at certain specific frequencies. The resulting currents injected into the geological formation 12 by the injection electrode 54 may also have a frequency that varies depending on the resistivity of the geological formation 12. Indeed, the relationship between the voltage supplied by the voltage source 62 and the current detected by the ammeter 64 may form the basis for a resistivity measurement 65. Specifically, by dividing the voltage signal V of the voltage source 62 by the current I measured by the ammeter 64, a complex impedance Z may be determined.

The resistivity measurement 65 may be processed in a data processing system 66. In FIG. 2, the data processing system 66 is shown schematically as a block diagram located away from the LWD resistivity tool 40. In an actual implementation, the data processing system 66 may be located within the LWD resistivity tool 40, at the surface 16, or any other suitable location. In the example of FIG. 2, the data processing system 66 includes a processor 67, memory 68, and storage 69. The processor 67 may carry out instructions encoded on the memory 68 or the storage 69. Such instructions may include instructions to process the resistivity measurement 65 in the manners described below. Additionally or alternatively, the instructions may cause the processor 67 to control the operation of the LWD resistivity tool 40. In one example, the processor 67 may execute instructions to cause the LWD resistivity tool 40 to obtain multiple resistivity measurements 65 at different angles of rotation of the downhole tool 40 within the drill string 18. The multiple resistivity measurements 65 may enable the data processing system 66 to at least partially isolate the effect of the drilling fluid 24 on the resistivity measurements 65. The memory 68 and/or storage 69 may be any suitable article of manufacture that can store such instructions. The memory 68 and/or storage 69 may be random-access memory (RAM), read-only memory (ROM), flash memory, optical storage, or a hard disk drive, to name a few examples.

Figure 3:
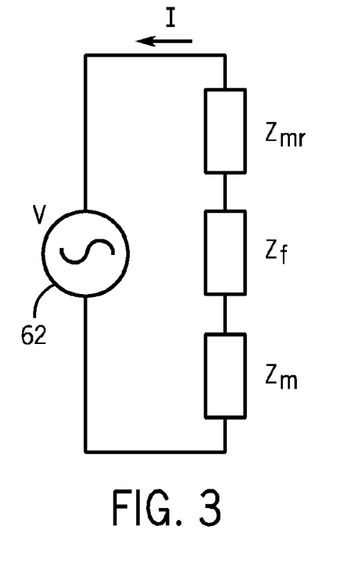
FIG. 3 is a circuit diagram of an equivalent circuit of the impedance measurements obtained by the resistivity tool, in accordance with an embodiment.

The complex impedance Z obtained through the resistivity measurement 65 of the LWD resistivity tool 40 may represent the sum of several impedance components. Each of these several impedance components relate to the various materials the current must pass through between the injection electrode 56 and the return electrode 52. An equivalent circuit showing these components of the complex impedance Z appears in FIG. 3. In FIG. 3, the voltage source 62 supplies an alternating current (AC) voltage signal V through three impedances: a mud impedance $Z_m$, a formation impedance $Z_f$, and a mud return impedance $Z_{mr}$. The mud impedance $Z_m$ represents the impedance due to the drilling fluid 24 ("mud") between the injection electrode 56 and the geological formation 12. The formation impedance $Z_f$ represents the impedance of the geological formation 12 between the injection electrode 56 and the return electrode 52. The mud return impedance $Z_{mr}$ represents the impedance of the drilling fluid, or mud, between the return electrode 52 and the geological formation 12. The LWD resistivity tool 40 may be designed so that the area of the return electrode 52 is much greater than the area of the injection electrode 56. As such, the resistivity measurement 65 obtained by the LWD resistivity tool 40 may not be sensitive to the drilling fluid adjacent to the return electrode 52. The mud return impedance $Z_{mr}$ between the return electrode 52 and the geological formation 12 thus may be neglected compared to the mud impedance $Z_m$ between the injection electrode 56 and the geological formation 12 owing to the significant differences between these measures. In other words, $Z_m >> Z_{mr}$. Alternatively, a small change to the mud impedance $Z_m$ may correct for the return impedance $Z_{mr}$.

Figure 4:
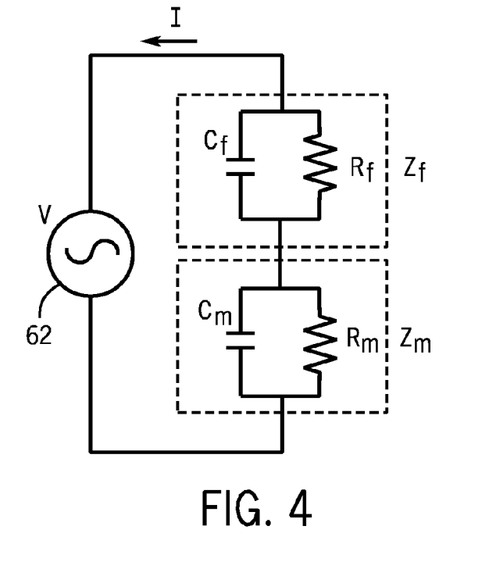
FIG. 4 is another equivalent circuit diagram of an equivalent circuit illustrating resistive and capacitive components of the resistivity measurement, in accordance with an embodiment.

Ignoring the mud return impedance $Z_{mr}$, the remaining formation impedance $Z_f$ and mud impedance $Z_m$ further may be understood to represent complex impedances composed of resistive and capacitive components. As seen in FIG. 4, for example, the formation impedance $Z_f$ may include both a capacitive component $C_f$ and a resistive component $R_f$. The mud impedance $Z_m$ may include a capacitive component $C_m$ and a resistive component $R_m$. As will be discussed below, in the formation impedance $Z_f$, the resistive component $R_f$ may dominate. When the drilling fluid 24 is oil-based mud, the capacitive component $C_m$ of the mud impedance $Z_m$ may dominate.

Thus, as shown in FIGS. 3 and 4, the total impedance Z may be given by:

$$Z = Z_m + Z_f,$$

where $$Z_m = (d_m/A_m)/\sigma^*_m; \text{ and}$$

$$Z_f = (d_f/A_f)/\sigma^*_f.$$

In the equations above, the complex conductivity, or admittivity, $\sigma^*$ is given by:

$$\sigma^* = \sigma + i\omega\epsilon,$$

and d is the effective distance along the current path, A is the effective area of the current path, and $\epsilon$ is the permittivity of the material.

The complex impedances $Z_m$ and $Z_f$ can be thought of as parallel R-C circuits, as shown in FIG. 4, according to the following equations:

$$R_m = d_m/(A_m \sigma_m)$$

$$C_m = \epsilon_m A_m/d_m$$

$$R_f = d_f/(A_f \sigma_f)$$

$$C_f = \epsilon_f A_f/d_f$$

In the equations above, $d_m$ is the thickness of the drilling fluid 24 ("mud") medium between the injection electrode 54 and the geological formation 12 while $A_m$ is the area of the injection electrode 54. To provide an example, if the drilling fluid 24 medium is 2 mm thick and the injection electrode 54 has a radius of 2.5 mm, the factor $A_m/d_m$ will be approximately $10^{-2}$ m. Concerning the geological formation 12, the factor $A_f/d_f$ may be approximately 10 to 100 times smaller than $A_m/d_m$ because the penetration depth in the formation $d_f$ may be much greater than the thickness of the drilling fluid 24 medium $d_m$.

The phase angles of the formation impedance $Z_f$ and mud impedance $Z_m$ are respectively given by:

$$\phi_m = -\tan^{-1}(\omega\epsilon_m/\sigma_m)$$

and $$\phi_f = -\tan^{-1}(\omega\epsilon_f/\sigma_f).$$

Values of $\omega\epsilon/\sigma$ for various possible components of the geological formation 12 and drilling fluid 24 may be taken from laboratory measurements.

Figure 5A:
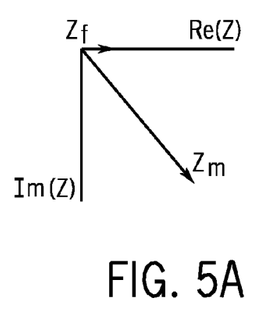
FIGS. 5A-C are complex impedance diagrams of resistivity measurements made by the resistivity tool under varying circumstances, in accordance with an embodiment.
Figure 5B:
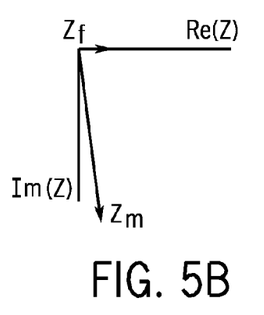
Figure 5C:
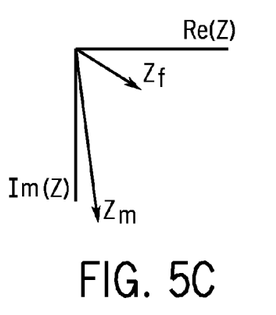

FIGS. 5A-C represent examples of impedance vectors when the mud impedance $Z_m$ is greater than the formation impedance $Z_f$. Under these circumstances, the phases of the mud impedance $Z_m$ and the formation impedance $Z_f$ may be assumed to be different. In FIGS. 5A-C, the mud impedance $Z_m$ and the formation impedance $Z_f$ are shown as vectors having a real Re(Z) component and an imaginary Im(Z) component.

In FIG. 5A, an impedance diagram shows the mud impedance $Z_m$ and the formation impedance $Z_f$ when a voltage signal operating at around 10 kHz is used. In the example of FIG. 5A, the drilling fluid 24 is oil-based mud and the geological formation 12 has a resistivity of about 100 Ωm. The mud impedance $Z_m$ is much greater than the formation impedance $Z_f$. Moreover, the phase of the mud impedance $Z_m$ appears to be in the range between −90 to −30 degrees, while the phase of the formation impedance $Z_f$ appears to be very close to zero (pure resistance).

FIG. 5B shows an impedance diagram of the mud impedance $Z_m$ and the formation impedance $Z_f$ when a voltage signal operating at around 50 MHz is used. In the example of FIG. 5B, the drilling fluid 24 is in oil-based mud and the geological formation 12 has a resistivity of about 1 Ωm. The mud impedance $Z_m$ is much greater than the formation impedance $Z_f$. Here, the phase of the mud impedance $Z_m$ is in the range −80 to −90 degrees, while the phase of the formation impedance $Z_f$ is close to zero (pure resistance).

FIG. 5C shows an impedance diagram of the mud impedance $Z_m$ and the formation impedance $Z_f$ when a voltage signal operating at around 50 MHz is used. In the example of FIG. 5C, the drilling fluid 24 is in oil-based mud and the geological formation 12 has a resistivity of about 10 Ωm. The mud impedance $Z_m$ is much greater than the formation impedance $Z_f$. Here, the phase of the mud impedance $Z_m$ is in the range −80 to −90 degrees, while the phase of the formation impedance $Z_f$ is about −30 degrees.

In all the situations of FIGS. 5A-C, the phases of the mud impedance $Z_m$ and the formation impedance $Z_f$ are different, and can be assumed to be different because oil-based mud is significantly more capacitive than most geological formation 12. As will be discussed below, the distinction between the phases of the mud impedance $Z_m$ and the formation impedance $Z_f$ may enable the resistivity measurement 65 to be used to discriminate against the drilling fluid 24 ("mud") and to become substantially sensitive only to the geological formation 12. In this way, the resistivity measurements 65 obtained by the LWD resistivity tool 40 may obtain more effect measurements of the geological formation 12, particularly when the geological formation 12 has a relatively low resistivity.

Figure 6:
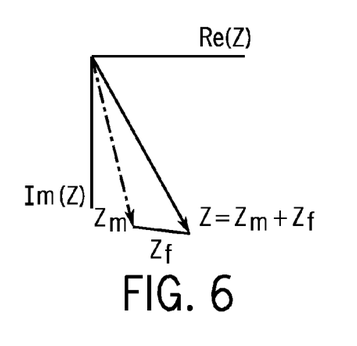
FIG. 6 is a complex impedance diagram representing the summation of formation and mud impedance components to a total impedance measured by the resistivity tool, in accordance with an embodiment.
Figure 7:
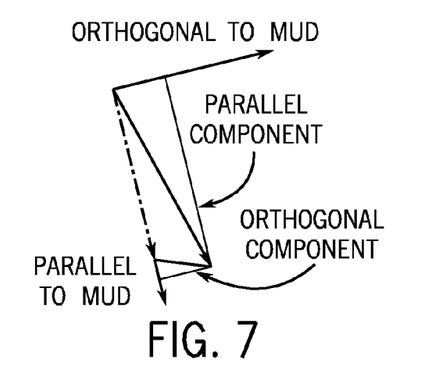
FIG. 7 is a complex impedance diagram illustrating a manner of identifying components of the total impedance due to the formation rather than the mud, in accordance with an embodiment.

To make such a discrimination, the component of the total impedance that is perpendicular to the phase of the mud impedance may be determined FIGS. 6 and 7 represent one manner in which this perpendicular component may be determined. In FIG. 6, a vector diagram plots impedance vectors on a set of real and imaginary axes. The vector diagram of FIG. 6 represent the formation impedance $Z_f$ and the mud impedance $Z_m$ components of the total impedance Z. As seen in the vector diagram of FIG. 6, the formation impedance $Z_f$ and the mud impedance $Z_m$ components sum to give the total impedance Z.

In FIG. 7, the total impedance Z is shown to be broken into components that are parallel and orthogonal to the phase of the mud impedance $Z_m$. The parallel component is sensitive primarily to the drilling fluid 24, and thus may be used as a qualitative indicator of the standoff of the injection electrode 54 and/or for quality control. The orthogonal component, by contrast, is substantially insensitive to the drilling fluid 24 and sensitive substantially only to the geological formation 12. Thus, by knowing the mud phase $\phi_m$—that is, the phase angle of the mud impedance $Z_m$ vector—the orthogonal and parallel components of the total impedance Z can be calculated using standard rotation equations. Specifically, the real Re(Z) and imaginary Im(Z) axes may be rotated by $90+\phi_m$ degrees to become the orthogonal and parallel axes, respectively.

The mud phase $\phi_m$ may be determined by measuring the total impedance Z at two distances, or standoffs, from the wall of the wellbore 14. The difference between the measurements of the total impedance Z at these two different standoffs may be due substantially entirely to the impedance of the additional amount of drilling fluid 24 between the two standoffs. As will be discussed below, these additional measurements may be obtained not by adding additional injection electrodes 56 or return electrodes 52, which may add cost and/or complexity to the LWD resistivity tool 40, but rather may obtain multiple resistivity measurements as the LWD resistivity tool 40 rotates within the deviated wellbore 14.

Figure 8:
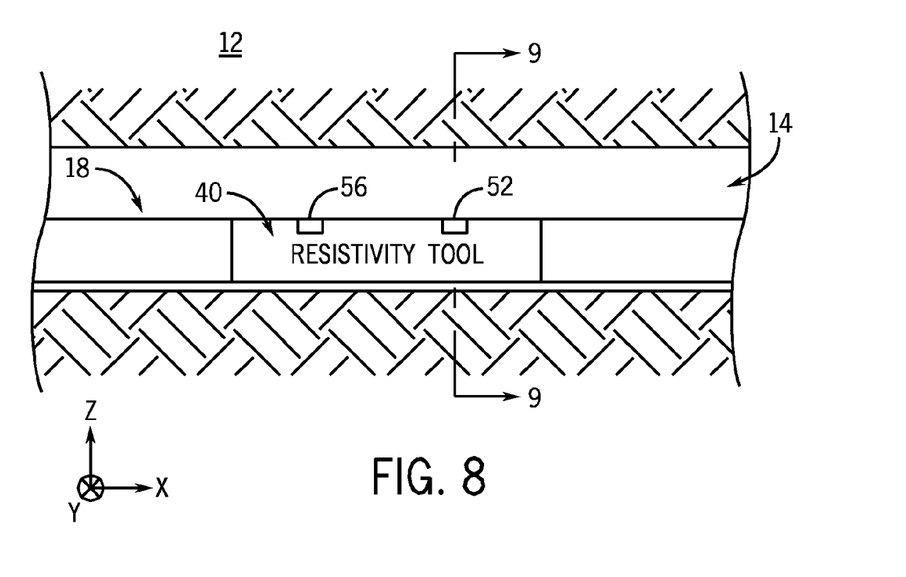
FIG. 8 is a cross-sectional view of the resistivity tool eccentered within a wellbore, in accordance with an embodiment.

For example, the LWD resistivity tool 40 may obtain at least two resistivity measurements at different angles of rotation while eccentered in the wellbore 14. As illustrated in FIG. 8, the LWD resistivity tool 40 may be eccentered in the wellbore 14 owing to gravity when the wellbore 14 is deviated or at least partially horizontal. In the example of FIG. 8, the drill string 18 is drawn by gravity toward the geological formation 12 on the lower side of the wellbore 14. The injection electrode 56 and the return electrode 52 of the LWD resistivity tool 40 are shown to be facing upward toward the interior of the wellbore 14, but their circumferential position will change as the drill string 18 rotates. In the example of FIG. 8, the wellbore 14 is horizontal and aligned substantially along the x axis of the coordinate system, which illustrates the position of the x, y, and z axes.

Figure 9:
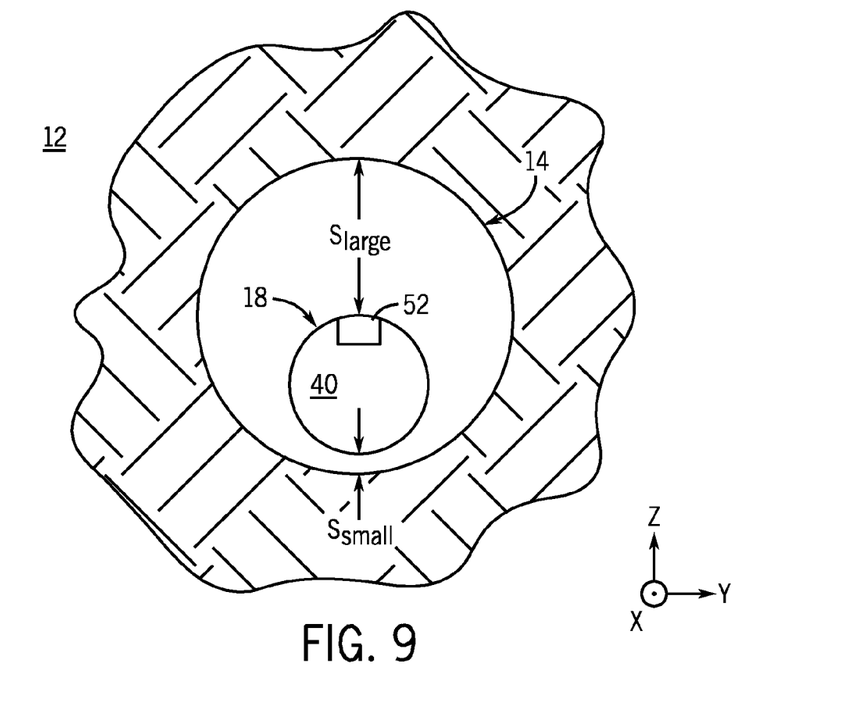
FIG. 9 is cross-sectional view of the resistivity tool in the borehole at cut-lines 9-9 of FIG. 8, in accordance with an embodiment.

FIG. 9 represents a cross-sectional view along a y-z plane at cut-lines 9-9 of FIG. 8. The LWD resistivity tool 40 can be seen to rest within the drill string 18 and inside of the larger wellbore 14. The return electrode 52 is currently shown facing upward, in the z-direction. Because gravity is causing the drill string 18 to be eccentered in the wellbore 14, the LWD resistivity tool 40 may have a large standoff $S_{large}$ when facing upward in the z-direction, and may have a small standoff $S_{small}$ when the return electrode 52 faces downward, opposite the z-direction. The LWD resistivity tool 40 may obtain at least two measurements at two different standoffs (e.g., the small standoff $S_{small}$ and the large standoff $S_{large}$, or any other standoffs between these two extremes) by obtaining two measurements at different respective angles of rotation. Taken together, these two measurements may enable the data processing system 66 to isolate the phase angle of the mud impedance vector $Z_m$, or mud phase angle $\phi_m$.

Figure 10:
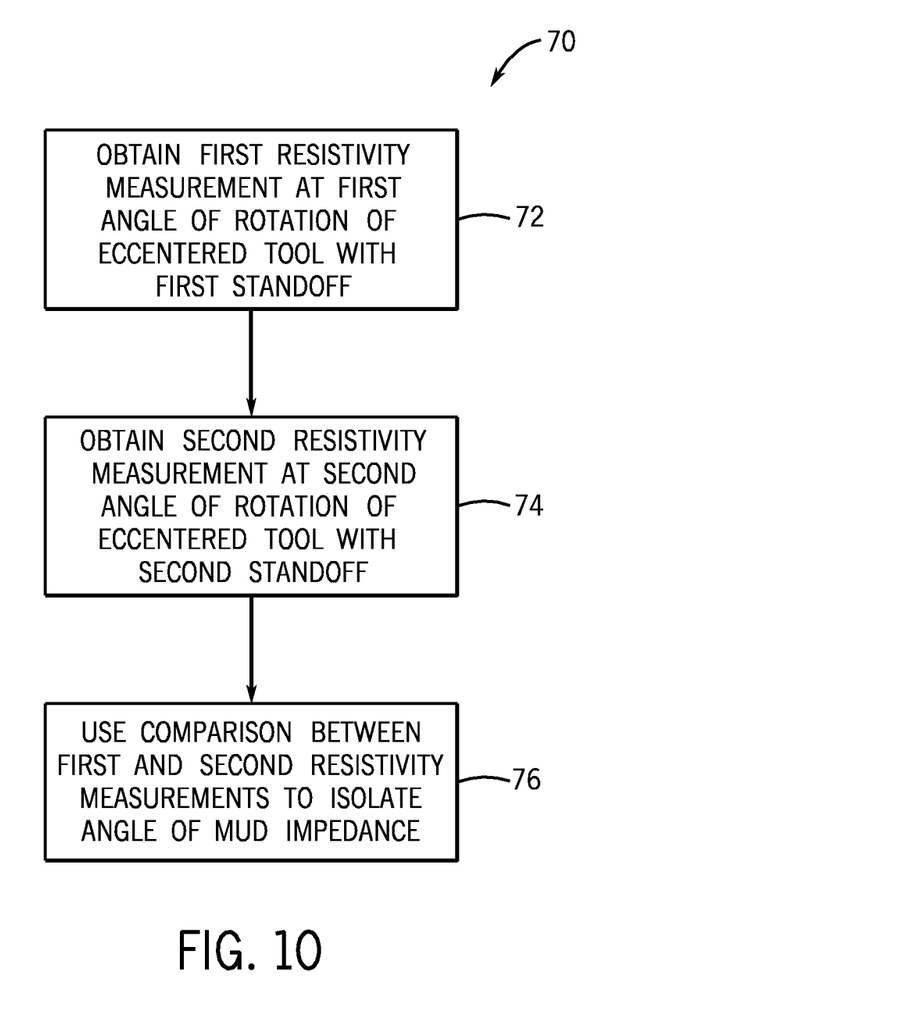
FIG. 10 is a flowchart of a method for ascertaining an angle of drilling fluid ("mud") impedance using at least two angles of rotation of the resistivity tool, in accordance with an embodiment.
Figure 11:
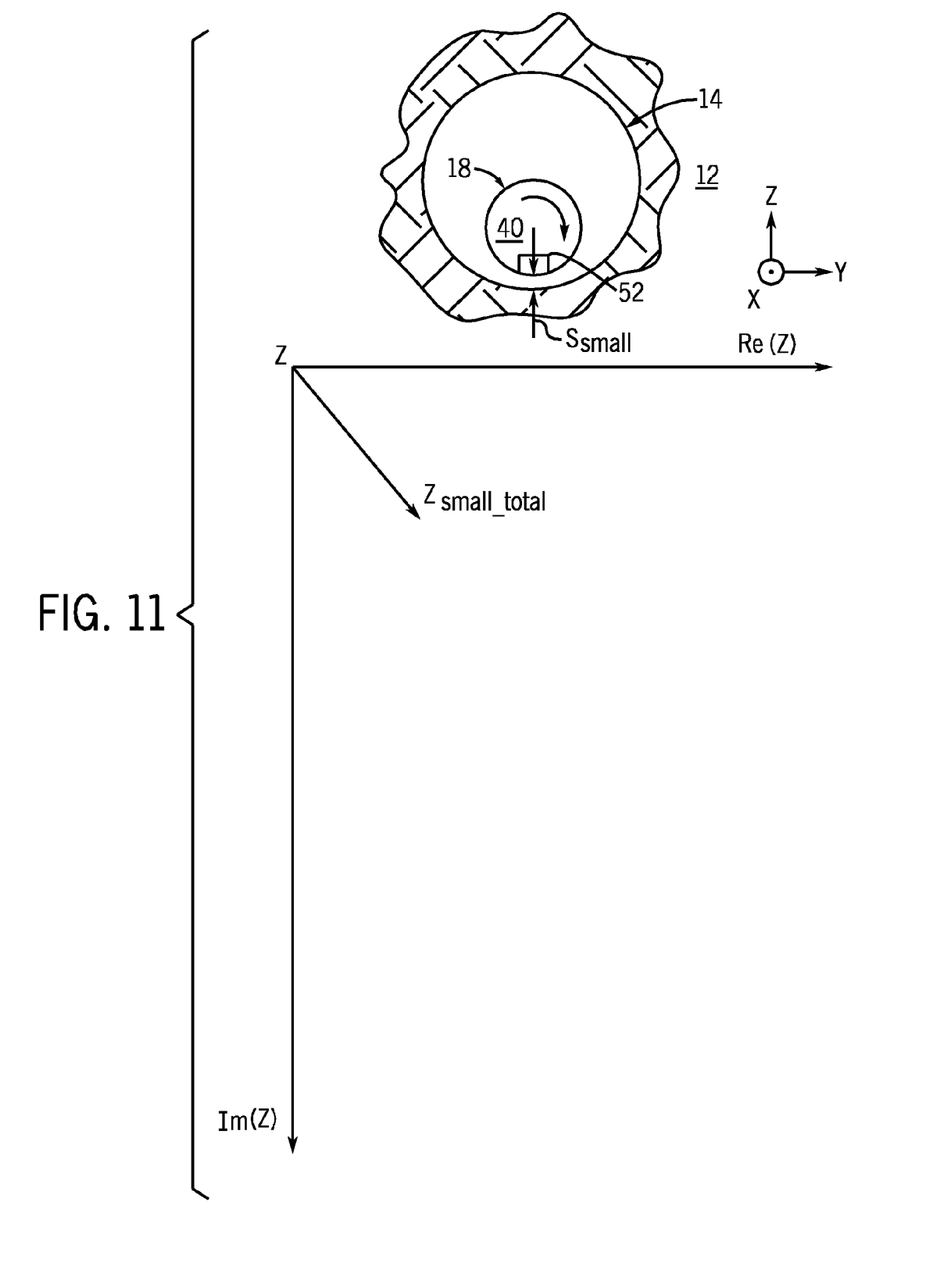
FIG. 11 is an illustration of a resistivity measurement obtained at a first angle of rotation and a corresponding first standoff, in accordance with an embodiment.
Figure 12:
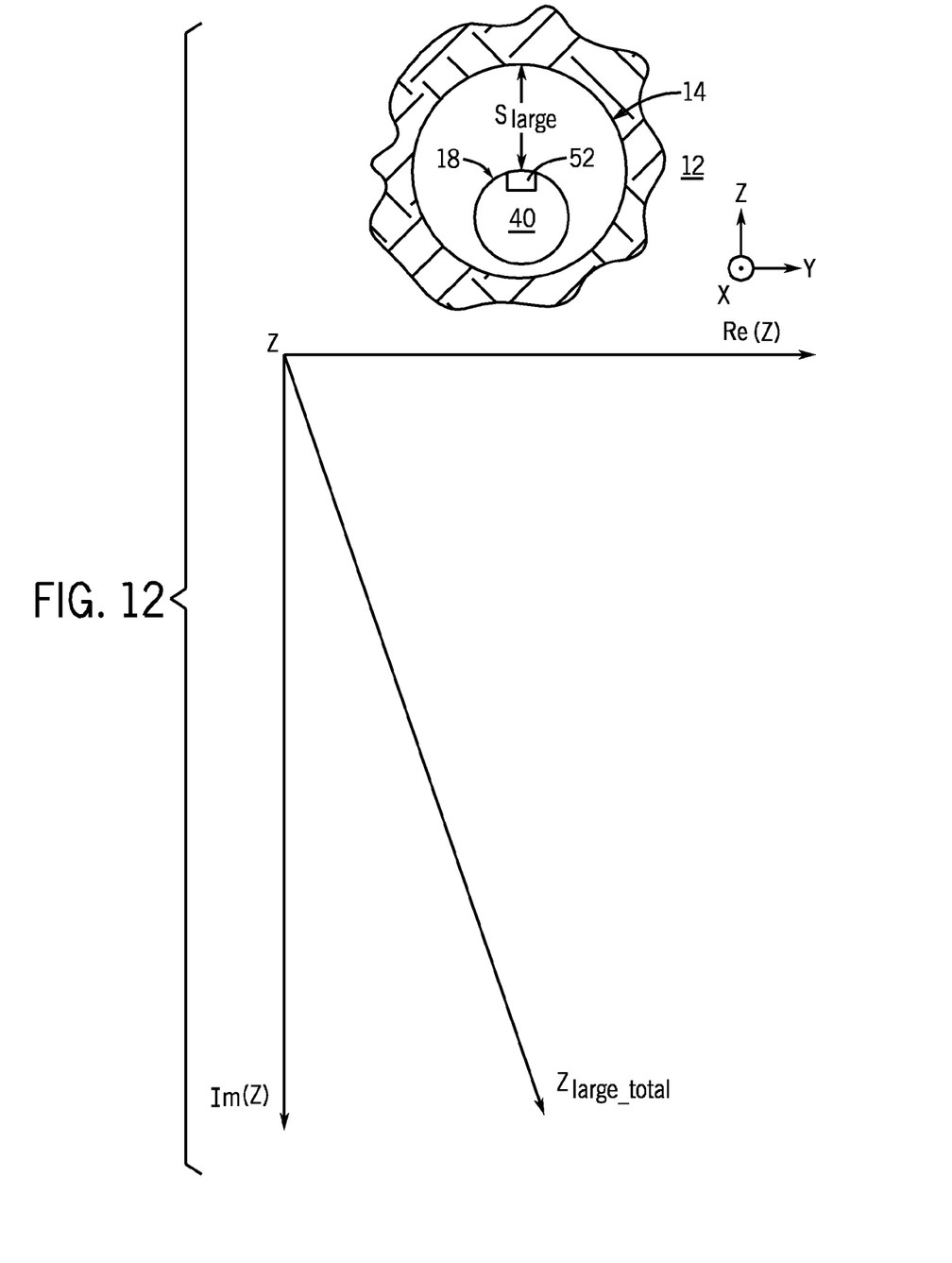
FIG. 12 is an illustration of a second resistivity measurement obtained at a second angle of rotation and a corresponding second standoff, in accordance with an embodiment.
Figure 13:
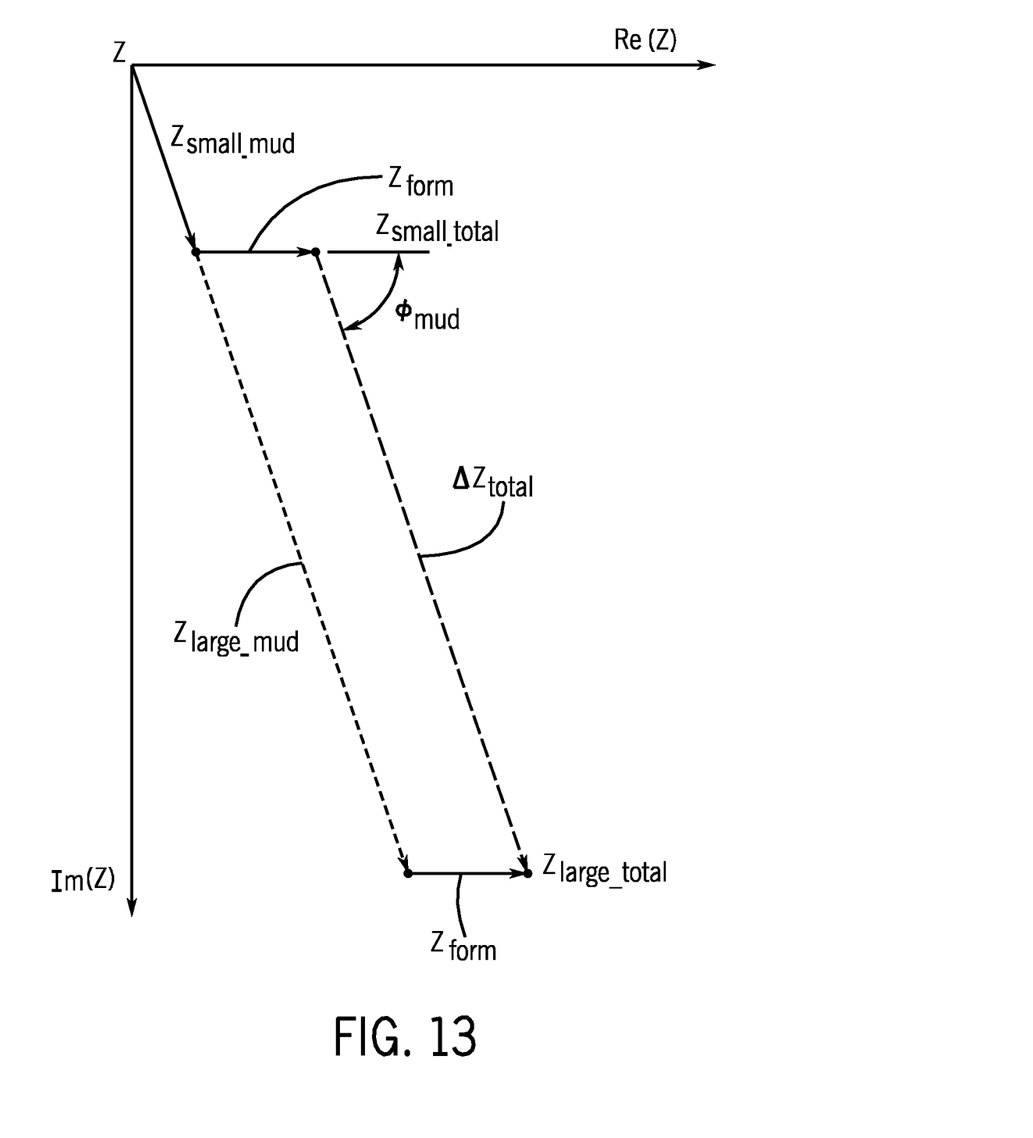
FIG. 13 is a vector diagram of a relationship between the first resistivity measurement of FIG. 11 and the second resistivity measurement of FIG. 12, in accordance with an embodiment.

A flowchart 70 of FIG. 10 describes one such method to isolate the mud phase angle $\phi_m$. For ease of explanation, the flowchart 70 of FIG. 10 will be described alongside FIGS. 11-13. Of these, FIGS. 11 and 12 illustrate two positions of the LWD resistivity tool 40 and the corresponding measured impedances that can respectively be obtained, while FIG. 13 illustrates a relationship between the two measured impedances. Considering the flowchart 70, the LWD resistivity tool 40 may obtain a first resistivity measurement at a first angle of rotation of the eccentered tool 40 (block 72 of FIG. 10). By obtaining a measurement at a first angle of rotation, the first resistivity measurement may be obtained with a first standoff from the wall of the wellbore 14. One example of such a first resistivity measurement appears in FIG. 11, in which the return electrode 52 is at the small standoff $S_{small}$. This first resistivity measurement may be plotted in a complex vector diagram as a complex impedance vector $Z_{small\_total}$.

After obtaining the first resistivity measurement, the LWD resistivity tool 40 may obtain a second resistivity measurement at a second angle of rotation of the eccentered tool (block 74 of FIG. 10). At this second angle of rotation, the return electrode 52 may have a different standoff, as generally illustrated in FIG. 12. In the example of FIG. 12, the return electrode 52 measures resistivity at the large standoff $S_{large}$, having rotated 180 degrees from the measurement illustrated in FIG. 11. This second resistivity measurement may be plotted as a complex vector $Z_{large\_total}$, as shown in FIG. 12.

Before continuing, note that there may be local circumferential variations in the geological formation 12 around the wellbore 14 in some instances (e.g., when the wellbore 14 is passing through layers or beds). These local variations may affect the first and second resistivity measurements at certain particular depths, but not others. As such, several different first resistivity measurements obtained at the first angle and several different second resistivity measurements obtained at the second angle may be collected over several different depths. Thereafter, these measurements may be averaged to obtain a first average resistivity measurement and a second average resistivity measurement, if desired.

The first resistivity measurement obtained at block 72 of FIG. 10 and the second resistivity measurement obtained at block 74 of FIG. 10 may be compared to isolate the angle of the mud impedance (block 76 of FIG. 10). Additionally or alternatively, the comparison of block 76 may involve a comparison of the average of several first resistivity measurements (e.g., the first average resistivity measurement) and the average of several second resistivity measurements (e.g., the second average resistivity measurement) taken at several different depths. Assuming that the geological formation 12 properties are generally the same along the circumference of the wellbore 14 where the measurements are obtained, the differences between the first resistivity measurement and the second resistivity measurement may be due substantially entirely to the impedance of the additional drilling fluid 24 ("mud") at the larger standoff (e.g., at the large standoff $S_{large}$, as compared to the small standoff $S_{small}$).

The first resistivity measurement obtained at block 72 of FIG. 10 and the second resistivity measurement obtained at block 74 of FIG. 10 are compared to one another in a vector diagram illustrated in FIG. 13. Specifically, the vector diagram of FIG. 13 relates the example impedances $Z_{small\_total}$ of FIG. 11 and $Z_{large\_total}$ of FIG. 12. Specifically, a vector $\Delta Z_{total}$ may be defined as the vector representing the difference between the impedance $Z_{small\_total}$ and the impedance $Z_{large\_total}$. The difference between the first resistivity measurement (e.g., $Z_{small\_total}$) and the second resistivity measurement (e.g., $Z_{large\_total}$) may be described as follows:

$$\Delta Z_{total} = Z_{large\_total} - Z_{small\_total}$$

The vector $\Delta Z_{total}$ may be understood to represent a component of the impedance $Z_{large\_total}$ that is due entirely to the impedance of the drilling fluid 24 ("mud") in the wellbore 14. As such, the angle of the vector $\Delta Z_{total}$ may be understood to represent the mud phase angle $\phi_m$:

$$\varphi_m = \arctan\left(\frac{\mathrm{Im}(\Delta Z_{total})}{\mathrm{Re}(\Delta Z_{total})}\right)$$

Having determined the mud phase angle $\phi_m$, resistivity measurements to ascertain the impedance of the geological formation 12 ($Z_{form}$ in the example of FIG. 13) may be refined to be more sensitive to the geological formation 12 and less sensitive to the drilling fluid 24 ("mud"). Indeed, a resistivity measurement of, for example, the impedance $Z_{small\_total}$ can be decomposed into the mud impedance $Z_{small\_mud}$ and the formation resistivity $Z_{form}$. In the example of FIG. 13, the angle of the complex impedance $Z_{small\_mud}$ will be known and equal to the mud phase $\phi_m$, but the magnitude of this vector may not be precisely known. Even so, the likely formation resistivity $Z_{form}$ may be estimated, knowing that the resistivity of the formation $Z_{form}$ is likely predominately resistive rather than capacitive. Moreover, the component of the formation impedance $Z_{form}$ within the impedance $Z_{small\_total}$ may be the same as that within the impedance $Z_{large\_total}$. The total impedance due to the drilling fluid 24 ("mud") at the large standoff $S_{large}$ may be $Z_{large\_mud}$, as illustrated in FIG. 13. When added to the formation impedance $Z_{form}$, the sum gives the impedance $Z_{large\_total}$.

Figure 14:
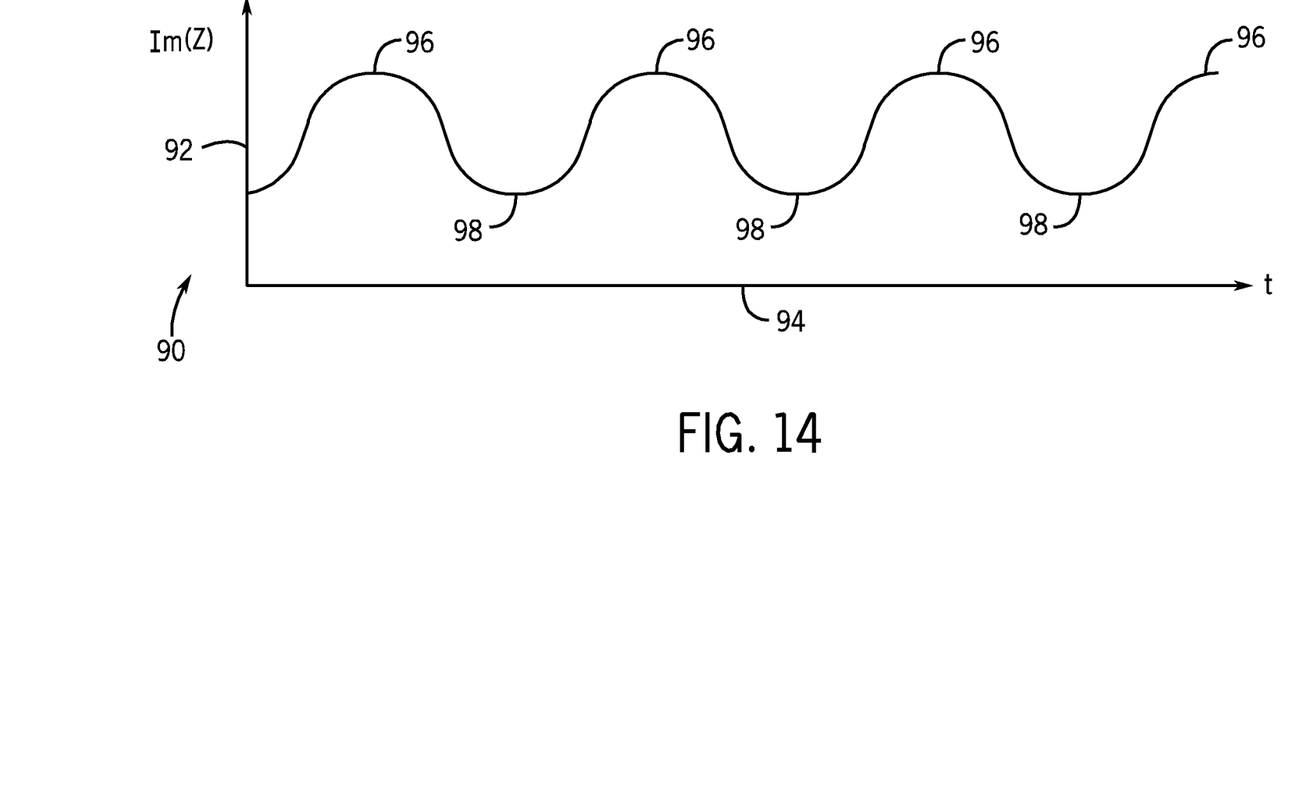
FIG. 14 is a plot of resistivity measurements obtained for a variety of angles of rotation, which may be used to identify a maximum and minimum standoff, in accordance with an embodiment.

Although any two or more resistivity measurements obtained at different standoffs may be used, the greatest distinction may become apparent when at least two of the resistivity measurements are respectively obtained at the small standoff $S_{small}$ and the large standoff $S_{large}$. One manner of identifying when the LWD resistivity tool 40 is obtaining measurements at these two most different standoffs appears in a plot 90 of FIG. 14. In the plot 90 of FIG. 14, the imaginary, or capacitive, component of the total impedance Z (ordinate 92), as measured by the LWD resistivity tool 40 is shown compared to time (abscissa 94). As mentioned above, as the drill string 18 rotates, the LWD resistivity tool 40 rotates accordingly. Thus, the resulting resistivity measurements may vary sinusoidally as the LWD resistivity tool measures different amounts of drilling fluid 24 ("mud") in the wellbore 14, and as the standoff changes from the small standoff $S_{small}$ to the large standoff $S_{large}$, and back again. The measurements as the standoff changes from the small standoff $S_{small}$ to the large standoff $S_{large}$, and back again, are reflected in the plot 90 as local maxima 96 and local minima 98. Because the drill string 18 may jostle and move throughout the wellbore 14, these local maxima 96 and the local minima 98 may not be identical each cycle. Even so, the series of local maxima 96 and local minima 98 may be isolated as representing the highest and lowest impedances. The local maxima 96 and local minima 98 may be averaged to obtain an average first resistivity measurement and an average second resistivity measurement, which may be used as the first resistivity measurement and the second resistivity measurement, respectively, in the same manner discussed above.

Figure 15:
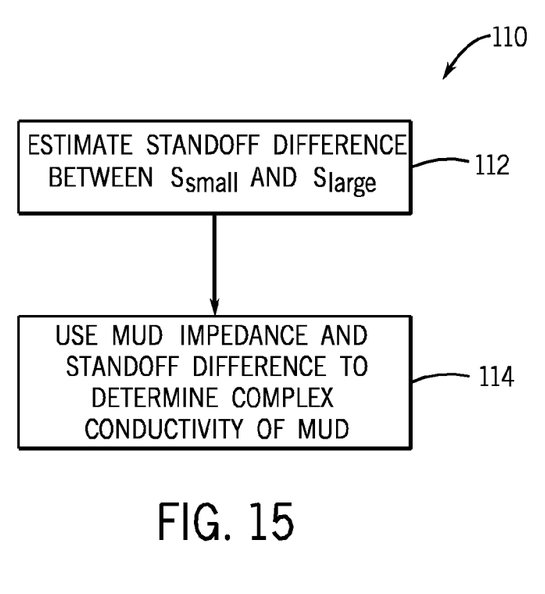
FIG. 15 is a flowchart of a method for estimating a complex conductivity of drilling fluid using the relationship between the resistivity measurements obtained shown in FIGS. 11 and 12, in accordance with an embodiment.

The mud impedance difference $\Delta Z_{total}$ may also be used to determine the complex conductivity of the drilling fluid 24, as shown by a flowchart 110 of FIG. 15. First, the standoff difference between the small standoff $S_{small}$ and the large standoff $S_{large}$ maybe estimated (block 112). The standoff difference, which may be referred to as $d_m$, may be estimated based on knowledge of the size of the drill string 18 in relation to the wellbore 14 and/or the estimation equations discussed below, or any other suitable technique. Using the mud impedance difference $\Delta Z_{total}$ and the standoff difference $\Delta d_m$, the complex conductivity of the mud $\sigma^*$ may be determined (block 114).

For example, in one example, the $\Delta Z_{total}$ measurement may be used to calculate the complex conductivity $\sigma^*$ of the drilling fluid 24, provided the geometry of the LWD resistivity tool 40 is accurately estimated, according to the following relationship:

$$\sigma^* = \Delta d_m / (A_m \Delta Z_{total}),$$

where $\Delta d_m$ is the distance between the small standoff $S_{small}$ and the large standoff $S_{large}$, and $A_m$ is the effective area of the injection electrode 56.

From the complex conductivity $\sigma^*$, the real-valued conductivity $\sigma$, permittivity $\epsilon$, and resistivity $\rho$ of the drilling fluid 24 may be obtained using the following equations:

$$\sigma = \mathrm{Re}(\sigma^*)$$

and $$\epsilon = \mathrm{Im}(\sigma^*)/\omega,$$

where $\sigma$ is the conductivity and $\epsilon$ is the permittivity. When the material is highly conductive, the real-valued resistivity is given by:

$$\rho = 1/\sigma.$$

In one example, the sensitivity of the LWD resistivity tool 40 to the drilling fluid 24 or the geological formation 12 may be adjusted by using more than one frequency (simultaneously or sequentially). For example, to estimate the standoffs of the LWD resistivity tool 40, a relatively low frequency (e.g., from about 10 kHz to 1 MHz) may be used, causing the LWD resistivity tool 40 to be much more sensitive to the drilling fluid 24 than the geological formation 12 (i.e., $Z_m \gg Z_f$).

Moreover, from the measured mud complex conductivity $\sigma^*$, the standoffs at each angle of rotation of the LWD resistivity tool 40 may be estimated as follows:

$$d_m = A_m |Z_m \sigma^*|,$$

where $d_m$ represents the value of standoff and the mud impedance may be estimated based on the mud phase angle $\phi_m$ and the estimated formation impedance $Z_f$ or $Z_{form}$.

In addition those parameters expressly discussed above, the $\Delta Z_{total}$ measurement may be used to calculate any other suitable electrical mud parameters. These may include, for example, a dissipation factor, a loss tangent, a ratio of imaginary and real parts of conductivity or resistivity, or a parameter relating a resistive component of an electromagnetic field inside the drilling mud to a reactive component of the electromagnetic field, to name a few examples.

In one example, the dissipation factor (DF) may be determined according to the following relationship:

$$DF = \frac{\sigma}{(\omega \cdot \varepsilon)};$$

where σ is the conductivity, ε is the permittivity, and ω* is the complex angular frequency.

The loss tangent (tan δ) may be calculated as follows:

$$\tan\delta = \frac{(\omega \cdot \varepsilon'' + \sigma)}{(\omega \cdot \varepsilon')},$$

where ε" represents the imaginary amplitude of permittivity attributed to bound charge and dipole relaxation phenomena and ε' represents the product of free space permittivity and the relative permittivity.

Ratios of imaginary and real parts of conductivity or resistivity may be determined according to the following relationships:

$$\text{Ratio1} = \frac{\text{Im}(\sigma^*)}{\text{Re}(\sigma^*)}; \text{ or}$$

$$\text{Ratio1} = \frac{\text{Im}(\sigma^*)}{\text{Re}(\sigma^*)},$$

or the inverse, to illustrate only a few examples.

In general, the electrical mud parameter the dissipative component of the electromagnetic field inside the drilling fluid 24 may be related to the reactive component of the electromagnetic field inside the drilling fluid 24. This relationship is governed by the macroscopic medium parameters of the drilling fluid 24 and may be described in numerous ways, including those described in this disclosure. To provide a further example, a new quantity Q may be defined as a measure of the heating up of a certain amount of drilling fluid 24 when exposed to an energy source emitting a certain amount of power. A second parameter P may represent a measure of the reactive component (e.g., as may be represented by placing the drilling fluid 24 between two parallel electrodes and measuring the capacitance that results). This measured capacitance may be the parameter P. The relationship P/Q, in this example, may be used as an electrical mud parameter of the drilling fluid 24.

To image the geological formation 12, it may be desirable to use higher frequencies that are less sensitive to the drilling fluid 24. For geological formations 12 with relatively low resistivity (e.g., below 1 Ωm), a frequency in the range 10-100 MHz may be used, while for those with high resistivities (e.g., above 100 Ωm), a frequency in the range of 100 kHz to 1 MHz may suffice. It should be understood that these frequency ranges are provided by way of example, and are not intended to be exhaustive.

The values of standoff and mud complex conductivity σ* may be used in any suitable processing techniques to determine properties of the geological formation 12. Moreover, the estimated values of the standoffs may be used for quality control of resistivity measurements and/or other measurements obtained by tools in the BHA 34 or elsewhere. The standoff may also be used to improve the accuracy of hole radius measurements.

The specific embodiments described above have been shown by way of example, and it should be understood that these embodiments may be susceptible to various modifications and alternative forms. For instance, although this disclosure discusses an LWD resistivity tool by way of example, in other embodiments, the resistivity tool may use any other suitable conveyance, including wireline, slickline, coiled tubing, and so forth. In all cases, however, the resistivity tool may be eccentered in the wellbore and may rotate to obtain measurements at different angles of rotation and, accordingly, at different standoffs. Finally, it should be further understood that the claims are not intended to be limited to the particular forms disclosed, but rather to cover modifications, equivalents, and alternatives falling within the spirit and scope of this disclosure.

What is claimed is:

1. A logging system comprising:
a resistivity tool configured to be eccentered in a wellbore filled with oil-based drilling mud at least when the wellbore is at least partially deviated, to rotate within the wellbore, and to obtain at least two resistivity measurements at different corresponding angles of rotation within the wellbore; wherein the resistivity tool comprises exactly one measuring electrode, the measuring electrode being configured to measure current being injected into a geological formation surrounding the wellbore; and
data processing circuitry configured to determine an electrical mud parameter by comparing the at least two resistivity measurements obtained at the two different angles of rotation within the wellbore.

2. The logging system of claim 1, wherein the resistivity tool comprises a logging-while-drilling tool.

3. The logging system of claim 1, wherein the current-measuring electrode is smaller than 2 inches in diameter.

4. The logging system of claim 1, wherein the resistivity tool is configured to obtain the at least two resistivity measurements at the different corresponding angles of rotation within the wellbore, wherein the different corresponding angles of rotation cause the at least two resistivity measurements to be obtained at two different standoffs from a geological formation surrounding the wellbore.

5. The logging system of claim 1, wherein:
the resistivity tool is configured to obtain the at least two resistivity measurements over a period of time as the resistivity tool rotates, wherein the at least two resistivity measurements comprise a plurality of resistivity measurements; and
the data processing circuitry is configured to determine a local maximum impedance and a local minimum impedance from among the plurality of resistivity measurements, wherein the data processing circuitry is configured to determine the mud phase angle by comparing the local maximum impedance and the local minimum impedance.

6. The logging system of claim 1, wherein:
the resistivity tool is configured to obtain the at least two resistivity measurements over a period of time as the resistivity tool rotates, wherein the at least two resistivity measurements comprise a plurality of resistivity measurements; and
the data processing circuitry is configured to determine a plurality of local maximum impedances and a plurality of local minimum impedances from among the plurality of resistivity measurements, wherein the data processing circuitry is configured to determine the mud phase angle by comparing an average or weighted average of the local maximum impedances and an average or weighted average of the local minimum impedances.

7. The logging system of claim 1, wherein the data processing circuitry is configured to determine the electrical mud parameter, wherein the electrical mud parameter comprises a mud phase angle, a dissipation factor, loss tangent, ratio of imaginary and real parts of conductivity or resistivity, or a parameter relating a resistive component of an electromagnetic field inside the drilling mud to a reactive component of the electromagnetic field.

8. The logging system of claim 1, wherein the data processing circuitry is configured to determine the electrical mud parameter, wherein the electrical mud parameter comprises a mud phase angle, and wherein the data processing circuitry is configured to determine the mud phase angle by ascertaining a complex vector difference between two of the at least two resistivity measurements and taking the angle of the complex vector difference.

9. The logging system of claim 1, wherein the data processing circuitry is configured to determine the electrical mud parameter, wherein the electrical mud parameter comprises a mud phase angle, and wherein the data processing circuitry is configured to determine the mud phase angle based at least in part on the following relationships:

$$\Delta Z_{total} = Z_{large\_total} - Z_{small\_total},$$

wherein $Z_{large\_total}$ total represents a larger of the at least two resistivity measurements, $Z_{small\_total}$ represents a smaller of the at least two resistivity measurements, and $\Delta Z_{total}$ represents a complex vector difference between the larger and smaller of the at least two resistivity measurements; and $$\varphi_m = \arctan\left(\frac{\operatorname{Im}(\Delta Z_{total})}{\operatorname{Re}(\Delta Z_{total})}\right),$$

where $\varphi_m$ represents the mud phase angle.

10. The logging system of claim 1, wherein the data processing circuitry is configured to ascertain a resistivity measurement of a geological formation that surrounds the wellbore based at least in part on a rotation of one of the at least two resistivity measurements by the mud phase angle to reduce the sensitivity of the one of the at least two resistivity measurements to the drilling fluid.

11. A method comprising:
   disposing a resistivity tool into a wellbore filled with a drilling fluid and surrounded by a geological formation;
   obtaining a first resistivity measurement using exactly one electrode of the resistivity tool, the electrode being configured to measure current being injected into a geological formation surrounding the wellbore, when the electrode is disposed a first angle of rotation corresponding to a first standoff from the geological formation within the wellbore;
   obtaining a second resistivity measurement using the electrode when the electrode is disposed a second angle of rotation corresponding to a second standoff from the geological formation within the wellbore; and
   processing at least the first and second resistivity measurements in data processing circuitry to ascertain a complex impedance vector due substantially entirely to the drilling fluid rather than the geological formation.

12. The method of claim 11, wherein the resistivity tool is disposed into the wellbore filled with the drilling fluid, wherein the drilling fluid comprises an oil-based mud.

13. The method of claim 11, wherein the first and second resistivity measurements are processed by subtracting the larger of the first resistivity measurement and the second resistivity measurement from the smaller of the first resistivity measurement and the second resistivity measurement to obtain the complex impedance vector due substantially entirely to the drilling fluid rather than the geological formation.

14. The method of claim 11, comprising:
   determining a first plurality of resistivity measurements at a corresponding plurality of depths using the electrode when the electrode is disposed the first standoff from the geological formation within the wellbore, wherein the first resistivity measurement comprises one of the first plurality of resistivity measurements;
   determining a second plurality of resistivity measurements at the corresponding plurality of depths using the electrode when the electrode is disposed the second standoff from the geological formation within the wellbore, wherein the second resistivity measurement comprises one of the second plurality of resistivity measurements;
   averaging the first plurality of measurements to obtain a first average resistivity measurement less sensitive to local variations in the geological formation than a single one of the first plurality of resistivity measurements; and
   averaging the second plurality of measurements to obtain a second average resistivity measurement less sensitive to local variations in the geological formation than a single one of the first plurality of resistivity measurements;
   wherein processing at least the first and second resistivity measurements in data processing circuitry comprises processing the first average resistivity measurement and the second average resistivity measurement to ascertain the complex impedance vector.

* * * * *